United States Patent [19]

Mott

[11] Patent Number: 4,935,185

[45] Date of Patent: Jun. 19, 1990

[54] METHOD OF MAKING A FIBRE-REINFORCED MOLDED RACQUET FRAME

[75] Inventor: Jonathan C. Mott, Wonersh-Nr. Guildford, England

[73] Assignee: Diversified Products Corporation, Opelika, Ala.

[21] Appl. No.: 265,333

[22] Filed: Oct. 24, 1988

Related U.S. Application Data

[63] Continuation of Ser. No. 838,791, Mar. 12, 1986, abandoned.

[30] Foreign Application Priority Data

Mar. 12, 1985 [GB] United Kingdom ............. 8506351

[51] Int. Cl.$^5$ .................. B29C 43/20; B29C 45/14
[52] U.S. Cl. ............................ 264/257; 264/258; 264/274; 264/279; 264/314; 273/73 D
[58] Field of Search ............. 273/73 D, 73 F, 73 L, 273/73 C; 264/317, 314, 257, 258, 263, 264

[56] References Cited

U.S. PATENT DOCUMENTS

| | | | |
|---|---|---|---|
| 2,903,388 | 9/1959 | Jonke | 264/258 |
| 3,420,929 | 1/1969 | Morin | 264/278 |
| 3,815,660 | 6/1974 | Gallagher | 273/73 D |
| 3,825,646 | 7/1974 | Delmotte | 264/257 |
| 3,874,667 | 4/1975 | Gallagher et al. | 273/73 D |
| 3,892,831 | 7/1975 | Robin | 264/314 |
| 3,896,206 | 7/1975 | Beaver | 264/258 |
| 3,947,029 | 3/1976 | Gallagher | 273/73 D |
| 3,949,029 | 3/1976 | Gallagher | 273/73 D |
| 3,949,988 | 4/1976 | Staufer | 264/314 |
| 3,993,308 | 11/1976 | Jenks | 273/73 D |
| 4,031,181 | 6/1977 | Schaefer | 264/258 |
| 4,183,776 | 1/1980 | Staub | 264/258 |
| 4,264,389 | 4/1981 | Staub | 264/258 |
| 4,361,533 | 11/1982 | Jenks | 264/258 |
| 4,440,392 | 4/1984 | Popplewell | 273/73 C |
| 4,544,518 | 10/1985 | Lindskog | 264/257 |
| 4,566,695 | 1/1986 | Melby | 273/73 D |
| 4,568,084 | 2/1986 | Mott | 273/73 D |
| 4,579,343 | 4/1986 | Mortvedt | 273/73 D |
| 4,609,194 | 9/1986 | Krent | 273/73 D |
| 4,793,958 | 12/1988 | Mott | 273/73 D |
| 4,798,382 | 1/1989 | James | 273/73 D |

FOREIGN PATENT DOCUMENTS

| | | | |
|---|---|---|---|
| 197806 | 6/1978 | Fed. Rep. of Germany | 273/73 D |
| 2656797 | 6/1978 | Fed. Rep. of Germany | 273/73 J |
| 2408276 | 10/1975 | France | 273/73 D |
| 1603834 | 12/1981 | United Kingdom | 273/73 D |

OTHER PUBLICATIONS

Plastics World, "Melt Away Insert Trims Part Weight"; May 1983, pp. 6–8.

*Primary Examiner*—Jay H. Woo
*Assistant Examiner*—Jeremiah F. Durkin, II
*Attorney, Agent, or Firm*—Banner, Birch, McKie & Beckett

[57] ABSTRACT

A method of making a fibre-reinforced molded racquet frame is disclosed. The method comprises placing two cores each including a respective tube having at least one layer of woven reinforcing fibres in a mold shaped to define the frame. A respective core is positioned on each side of the split-line of the mold. A plurality of string-securing members are formed with each string-securing member comprising a first portion shaped to receive and position at least one string of stringing to be secured in the frame and a second portion adapted to be embedded in the frame. The string-securing member is supported such that, upon closure of the mold, the second portions are disposed inside the mold cavity and entrapped between the two cores while the first portions project out of the mold cavity into the area which will be surrounded by the mold frame. A plastics material is injected into the mold around the cores and the second portions of the string-securing members. The plastics material preferably has a relatively low setting temperature and a relatively low viscosity.

22 Claims, 2 Drawing Sheets

METHOD OF MAKING A FIBRE-REINFORCED MOLDED RACQUET FRAME

This application is a continuation of application Ser. No. 838,791, filed Mar. 12, 1986 now abandoned.

TECHNICAL FIELD

This invention relates to racquets for use in games such as tennis, squash, racquet-ball and the like. The invention is more particularly concerned with methods of making fibre-reinforced molded racquet frames.

BACKGROUND OF THE INVENTION

It is known to mold racquet frames in fibre-reinforced thermoplastics material, with the fibre reinforcement taking the form of continuous filamentary material woven into a fabric or braid. However, currently available methods of producing such molded racquet frames suffer from a number of disadvantages. For example, they are rather time-consuming, firstly because the fibres normally have to be pre-impregnated with the epoxy or polyester resin into which they are to be molded. The pre-impregnated fibres are then laid in the mold, which is closed and heated to an elevated temperature while further epoxy or polyester resin is injected and allowed to cure (or set). This process typically takes over an hour, during which at least some resin usually escapes from the mold. As a result of this, and of the fact that the resin is fairly viscous, the surface finish of racquet frames made by the known methods is usually rather poor, so that, on removal from the mold, further surface finishing operations such as deflashing, filling voids and holes, polishing and/or coating are necessary to render the appearance of the frames acceptable. Additionally, it can be difficult to provide frames molded by these methods with stringing holes or other string-supporting structures.

SUMMARY OF THE INVENTION

It is therefore an object of the present invention to provide methods of making fibre-reinforced molded racquet frames in which some or all of the above-mentioned disadvantages are alleviated.

According to one aspect of the invention, there is provided a method of making a fibre-reinforced molded racquets frame, the method comprising placing at least one core including a tube comprising at least one layer of woven reinforcing fibres in a mold shaped to define the frame, and injecting a plastics material having a relatively low setting temperature and a relatively low viscosity, such as a methacrylate-based resin, into the mold around the core or cores.

Because the plastics material has a relatively low viscosity, it not only penetrates the weave of the reinforcing fibres, but also forms a thin layer between the outside of the tube of fibres and the walls of the mold cavity. This layer has the result that the molded racquet frame already has a good surface finish when it is removed from the mold.

Each core can further comprise an inflatable tube disposed inside the tube of reinforcing fibres, in which case the method can further include the steps of inserting the inflatable tube, either uninflated or slightly inflated, into the tube of reinforcing fibres prior to placing the core in the mold, and maintaining the inflatable tube inflated during the injection and setting of the plastics material.

Alternatively and preferably, each core can comprise a plastics foam core member, advantageously an extruded polyethylene foam core member, disposed inside the tube of reinforcing fibres, in which case the method can advantageously further include the step of weaving the tube of reinforcing fibres, preferably in the form of a braid, around the core member.

The reinforcing fibres can be carbon fibres, boron fibres, glass fibres, silicon carbide fibres or aramid fibres of the kind available under the trademark Kevlar, or any combination of these.

Where the tube of reinforcing fibres is woven into a braid, it is preferably woven in at least two contrasting colors, for example by using black carbon fibres and yellow Kevlar fibres. This has the effect of producing a striking finished appearance for the frame, as will become apparent hereinafter.

In a preferred implementation of the method, two cores are laid in the mold, one on each side of the split-line thereof, and the method further includes the steps of producing a plurality of string-securing members each comprising a first portion shaped to receive and position at least one string of the stringing to be secured in the frame and a second portion adapted to be embedded in the frame, and, prior to said injecting step, supporting the string-securing members such that said second portions are disposed inside the mold cavity between the two cores while the first portions project out of the mold cavity into the area which will be surrounded by the molded frame.

Preferably, each string-securing member comprises a generally U-shape wire loop having the upper ends of the limbs of its U-shape bent over, whereby the bent over upper ends of the loop constitute said second portion of the string-securing member.

According to another aspect of the invention, there is provided a method of making a fibre-reinforced molded racquet frame, the method comprising placing at least one core including the reinforcing fibres in a mold shaped to define the frame, and injecting a plastics material into the mold around the core, wherein said core is produced by weaving a tube of reinforcing fibres around an elongate plastics foam core member.

The plastics foam is preferably polyethylene foam, and the core member is preferably formed by extrusion, while the plastics material injected into the mold and the fibres may take any of the forms specified in relation to the first aspect of the invention. Additionally, a string-securing member or members can be provided as described in relation to the first aspect of the invention.

According to a further aspect of the invention, there is provided a method of making a fibre-reinforced molded racquet frame, the method comprising placing two cores each including a respective tube comprising at least one layer of woven reinforcing fibres in a mold shaped to define the frame, a respective core being positioned on each side of the split-line of the mold, producing a plurality of string-securing members each comprising a first portion shaped to receive and position at least one string of the stringing to be secured in the frame and a second portion adapted to be embedded in the frame, supporting the string-securing members such that said second portions are disposed inside the mold cavity between the two cores while the first portions project out of the molded frame, and injecting a plastics material into the mold around the cores and said second portions of the string-securing members.

The injected plastics material, the reinforcing fibres, the cores and the string-securing members can take any of the forms specified in relation to the first aspect of the invention.

The invention also includes racquet frames made by any of the methods of the above-mentioned aspects of the invention, and racquets incorporating such frames.

BRIEF DESCRIPTION OF THE DRAWINGS

The invention will now be described, by way of example only, with reference to the accompanying drawings, of which.

DETAILED DESCRIPTION OF THE INVENTION

Figure 1:
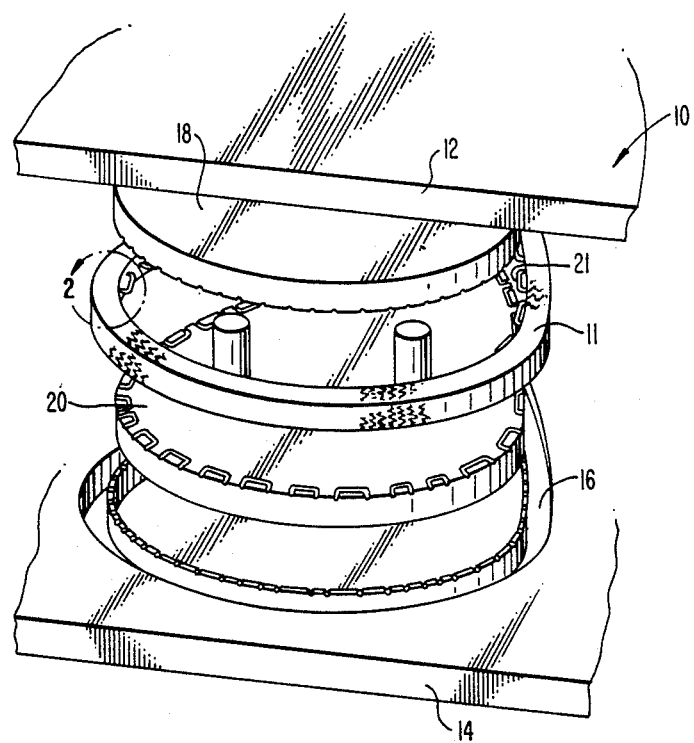
FIG. 1 is an exploded perspective view of a mold for making a fibre-reinforced molded racquet frame by a method in accordance with the present invention.

The mold shown in FIG. 1 is designated generally by reference 10, and is intended for molding a racquet frame of the kind shown at 11. As can be seen in FIG. 1, mold 10 comprises four principal parts, namely upper and lower complementary mold plates 12 and 14, which together define the basic mold cavity 16 in which the racquet frame 11 is molded, and upper and lower locating members 18, 20. Locating members 18, 20 together define a cassette for precisely locating and supporting a one-piece sinuous titanium wire string-securing member 21 which is to be molded into racquet frame 11. Mold 10, string-securing member 21 and the way the latter is located and supported with respect to mold 10 are substantially described in United Kingdom Patent Application No. 8426226. However, racquet frame 11, and the precise method by which it is molded in the mold 10 differ from the frame and method described in that application in several important respects, as follows.

Firstly, frame 11 is reinforced by continuous woven reinforcing fibres, preferably a combination of carbon fibres for tensile and flexural strength and Kevlar fibres for impact resistance. The carbon fibres are black, while the Kevlar fibres are yellow, and respective bundles of both fibres are preferably woven together into a multi-layer tubular braid 24 having a strikingly zig-zag striped appearance of the kind shown in FIGS. 2 and 3. Braid 24 forms part of a core 26, which is produced by weaving successive layers of fibres, each layer containing both kinds of fibres, onto an extruded polyethylene foam core member 28, until a braided tube, four or five layers thick, is woven onto the core member.

The weaving technique involved is known per se, e.g., for the weaving of boot- or shoe-laces on a fibre core, and involves pulling the core member 28 along the center line or axis of a multi-spindle braiding machine while weaving the first layer therearound, then passing the core member with the first layer of braid on it through the same braiding machine again to weave the second layer therearound, and so on. To give added tensile strength, a layer of longitudinally-extending fibres is applied to core 26, preferably between the penultimate and the final braided layers.

The weaving of braid 24 onto core member 28 ensures an extremely tight fit therebetween, so that the braid and core member form an almost integral structure with significantly greater integration between the braid and the core member than can be achieved by simply inserting the latter into the former after weaving (particularly bearing in mind that if the braid were separately woven to be such a tight fit on the core member, it would probably not then be possible to insert the core member into it).

It will be appreciated that core 26 can be continuously produced as described above to form considerable continuous lengths thereof, which are typically wound onto drums. Then, when required, any desired length of core 26 is simply unwound and cut from the drum.

Figure 2:
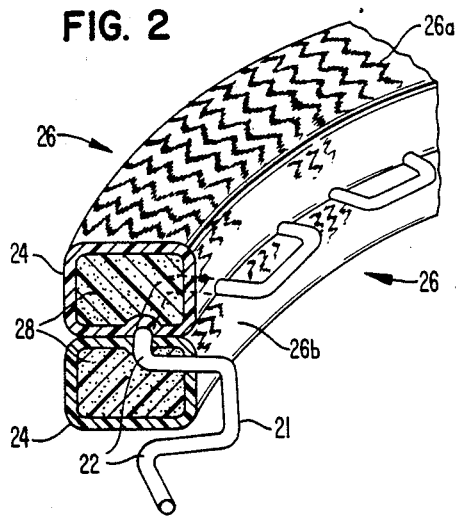
FIG. 2 is a detailed perspective view, partially in section, of the part of the racquet frame being molded in the mold of FIG. 1, at an early stage in the molding process.
Figure 3:
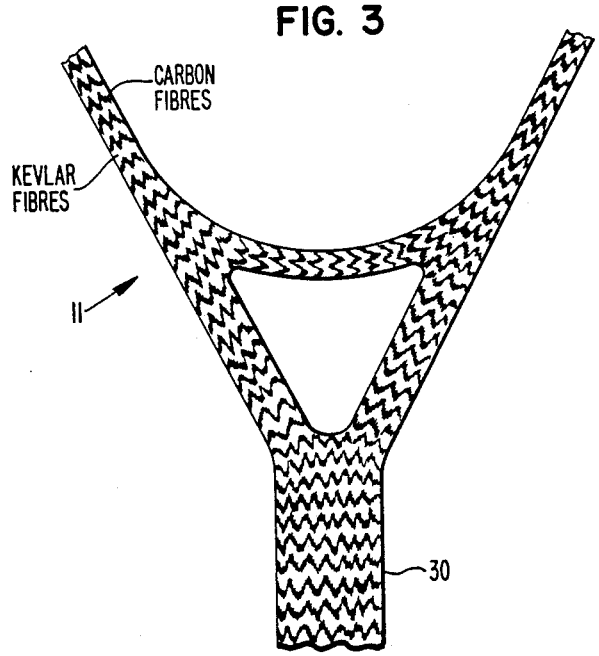
FIG. 3 is a plan view of the part of the finished racquet frame molded in the mold of FIG. 1, but with the string-securing wire omitted for the sake of simplicity.

To mold racquet frame 11, a first cut length 26a of core 26 is placed in the portion of mold cavity 16 in upper mold plate 12, and a second cut length 26b of core 26 is placed in the portion of the mold cavity in the lower mold plate 14: the walls of the mold cavity are previously sprayed with a releasing agent, and it has been found that this assists in holding the cores 26a and 26b in their respective halves of the mold cavity. String-securing member 21 is then mounted in the cassette defined by locating members 18, 20, as described in the aforementioned UK patent application, and a bundle of reinforcing fibres (preferably carbon fibres) may, if desired, be interwoven with portions 22 of string-securing member 21 protruding from the cassette (i.e., the portions intended to be disposed in mold cavity 16). Mold 10 is then assembled, i.e. closed, as also descibed in the aforementioned UK patent application, with the result that the portions 22 of the member 21 disposed within the mold cavity 16, and the reinforcing fibres woven therearound, are trapped between cores 26a and 26b as shown in FIG. 2. As mold 10 is closed, cores 26a and 26b tend to be compressed against each other and around portions 22 of member 21, which ensures that member 21 is firmly keyed into molded frame 11 as will become apparent hereinafter.

Once the mold 10 is assembled in its closed condition, a low viscosity, low temperature setting plastics material, for example, in the form of a methacrylate-based resin is injected into mold cavity 16 under pressure. We have found that a particularly suitable resin is that available from the Mond division of ICI under the trademark "Modar 835", which is a high molecular weight methacrylate-based resin in methyl methacrylate solution. It has a viscosity of 40 cps at 20° C. The resin is typically injected at a pressure of 30 p.s.i. and maintained at a temperature of about 20° C. during curing (or setting), under which conditions it sets, and mold 10 can be opened to remove molded frame 11, in about four minutes. However, if the resin is maintained at the higher temperature of about 85° C., it sets in about one minute.

Because of its low viscosity, the methacrylate resin not only penetrates the weave of the reinforcing fibres of cores 26a and 26b and of the fibres woven around portions 22 of string-securing member 21, but also forms a thin layer between the cores on the one hand and the walls of cavity 16. The penetration of the resin ensures that string-securing member 21 is firmly keyed into the resulting molded racquet frame 11 by the various reinforcing fibres. Additionally, the aforementioned formation of a thin layer of resin has the result that, when mold 10 is opened, the resulting molded racquet frame requires little or no further surface finishing to enhance its appearance. In fact, the molded frame 11 has the rather striking appearance shown in FIG. 3, with a smooth finish and the regular yellow and black zig-zag pattern of the braid clearly visible through the transparent resin: consequently, little or no further surface finishing is necessary. All that remains to complete the racquet, therefore, is fitting a suitable grip (not shown) on handle part 30 of molded frame 11, and securing the stringing (not shown) to string-securing member 21.

It will be appreciated that the above described method of making racquet frame 11 has a number of advantages. Primarily, it is relatively fast and clean, and produces a racquet frame that needs little or no further surface finishing and can if desired have a striking appearance. Additionally, the use of carbon and Kevlar reinforcing fibres means that racquet frame 11 is light and strong, with a good impact resistance. Most importantly, test have shown that even without the further bundle of reinforcing fibres wound around string-securing member 21, the force required to pull this member from molded frame 11 was extremely large, so large in fact that, on occasions, the wire simply broke before it could be pulled out.

Many modifications can be made to the above-described method of making racquet frame 11. For example, reinforcing fibres other than carbon and Kevlar can be used, e.g., glass fibres, silicon carbide fibres or boron fibres, either on their own or in combination with each other. Various different weaving patterns and color combinations can also be used, to produce different visual effects or patterns in the surface of the finished frame, e.g., diamond patterns, pepper-and-salt patterns and so on. Also, cores 26a and 26b can be formed with hollow inflatable core members in place of the foam core member 28, this inflatable core member being inserted into the braid 24 while uninflated or only partially inflated, and then fully inflated during the molding process. Furthermore, other suitable low temperature curing, low viscosity resins or like plastics materials can be used in place of the specific methacylate resin cited, including other resins in the "Modar" range of resins offered by ICI. Indeed, a thermosetting plastics material can also be used, but in that case, some of the advantages of the above-described method of making the racquet frame 11 would be lost.

Another modification which can be made is to replace the single string-securing member 24 with a plurality of individual stringing loops, which can take any convenient form and need not be made from wire: all that is required is a first portion to define a loop or eye for the stringing and a second or root portion shaped to be embedded in molded frame 11.

I claim:

1. A method of making a fibre-reinforced molded racquet frame, the method comprising the steps of:
   forming two separate cores each including a respective tube having at least one layer of woven reinforcing fibres;
   forming a mold cavity within a mold in the shape of the racquet frame with a first portion of the mold cavity formed in an upper mold plate and a second portion of the mold cavity formed in a lower mold plate;
   placing one of the cores in the first portion of the mold cavity in the upper mold plate and placing the other of the cores in the second portion of the mold cavity in the lower mold plate with opposing surfaces of the cores facing one another;
   forming a plurality of string-securing members with each string-securing member comprising a first portion in the form of a loop and a second portion in the form of an anchorage connected to the loop, the loop being shaped to receive and position at least one string of stringing in the area between the loop and the inside surface of the molded frame;
   placing, while the first and second mold plates are separated, the second portion of each string-securing member in a position overlying the opposing surfaces of the cores with the first portions of each string-securing member projecting out of the mold cavity into the area which will be surrounded by the molded frame;
   closing the mold to place the opposing surfaces of the separate cores into contact with one another and into contact with the second portions of the string-securing members;
   injecting a plastics material into the mold around the cores and the second portions of the string-securing members;
   allowing the plastics material to harden in the mold cavity to form to the molded racquet frame; and
   removing the molded racquet frame formed of the cores, hardened plastics material and string-securing members from the mold cavity.

2. A method as claimed in claim 1, wherein said injected plastics material is a plastics material having a low setting temperature and a low viscosity.

3. A method as claimed in claim 2, wherein said injected plastics material is a methacrylate-based resin.

4. A method as claimed in claim 1, wherein each core further comprises an inflatable tube disposed inside the tube of reinforcing fibres, and wherein the method further includes the steps of inserting the inflatable tube into the tube of reinforcing fibres prior to placing the core in the mold, and maintaining the inflatable tube inflated during the injection and setting of the plastics material.

5. A method as claimed in claim 1, wherein each core further comprises a plastic foam core member disposed inside the tube of reinforcing fibres.

6. A method as claimed in claim 5, wherein said plastics foam core member is formed as an extruded polyethylene foam core member.

7. A method as claimed in claim 5, further including the step of weaving each layer of reinforcing fibres around the core member.

8. A method as claimed in claim 6, further including the step of weaving each layer of reinforcing fibres around the core member.

9. A method as claimed in claim 7, comprising successively weaving a plurality of layers of reinforcing fibres around the core member, forming on said plurality of layers a further layer of reinforcing fibres which extend parallel to each other and substantially longitudinally of the core member, and then weaving at least one outer layer of reinforcing fibres around the layer of longitudinally extending fibres.

10. A method as claimed in claim 7, wherein each layer of woven reinforcing fibres is woven as a braid.

11. A method as claimed in claim 7, wherein the reinforcing fibres are selected and woven as tows of two contrasting colors.

12. A method as claimed in claim 7, wherein the reinforcing fibres are selected from the group consisting of carbon fibres, boron fibres, glass fibres, silicon carbide fibres, aramid fibers, and combinations thereof.

13. A method as claimed in claim 1, wherein each string-securing member comprises a generally U-shaped wire loop having the upper ends of the limbs of its U-shape bent over, whereby the bent over upper ends of the loop constitute said second portion of the string-securing member.

14. A method as claimed in claim 13, wherein a plurality of said string-securing members are integrally formed by bending a single length of wire.

15. A method as claimed in claim 14, further comprising arranging further elongate reinforcing fibres to engage said upper ends of said limbs in the mold cavity, to be molded to the frame therewith.

16. A method as claimed in claim 13, wherein said wire is titanium wire.

17. A method as claimed in claim 1, wherein the plastics material is a resin.

18. A method as claimed in claim 1, wherein the plastics material is a polymer.

19. A method as claimed in claim 4, wherein the inserting step includes the inflatable tube being uninflated.

20. A method as claimed in claim 4, wherein the inserting step includes the inflatable tube being slightly inflated.

21. A method as claimed in claim 1, wherein said forming includes the string-securing members being formed as a continuous one-piece structure.

22. A method as claimed in claim 1, wherein said forming includes the string-securing members being formed as a plurality of individual stringing loops.

* * * * *